(12) United States Patent
Benda et al.

(10) Patent No.: US 7,644,731 B2
(45) Date of Patent: Jan. 12, 2010

(54) GAS VALVE WITH RESILIENT SEAT

(75) Inventors: Jiri Benda, Brno (CZ); Pavel Konecny, Chudcice (CZ)

(73) Assignee: Honeywell International Inc., Morristown, NJ (US)

( * ) Notice: Subject to any disclaimer, the term of this patent is extended or adjusted under 35 U.S.C. 154(b) by 239 days.

(21) Appl. No.: 11/565,480

(22) Filed: Nov. 30, 2006

(65) Prior Publication Data

US 2008/0128037 A1 Jun. 5, 2008

(51) Int. Cl.
*F16K 11/04* (2006.01)
(52) U.S. Cl. .............................. 137/625.5; 137/625.33
(58) Field of Classification Search ............ 137/625.33, 137/625.34, 625.27, 625.5, 630.172; 251/210
See application file for complete search history.

(56) References Cited

U.S. PATENT DOCUMENTS

| 424,581 | A | * | 4/1890 | Sickels ........................ 251/210 |
| 1,156,977 | A | * | 10/1915 | Cloos ..................... 137/630.17 |
| 2,403,692 | A | | 7/1946 | Tibbetts |
| 2,791,238 | A | * | 5/1957 | Bryant ................... 137/625.34 |
| 2,975,307 | A | | 3/1961 | Schroeder et al. |
| 3,202,170 | A | * | 8/1965 | Holbrook ................. 137/625.5 |
| 3,304,406 | A | | 2/1967 | King |
| 3,381,623 | A | | 5/1968 | Elliott |
| 3,414,010 | A | | 12/1968 | Sparrow |
| 3,641,373 | A | | 2/1972 | Elkuch |
| 3,769,531 | A | | 10/1973 | Elkuch |
| 3,803,424 | A | | 4/1974 | Smiley et al. |
| 3,884,266 | A | * | 5/1975 | Kondo ................... 137/625.27 |
| 3,947,644 | A | | 3/1976 | Uchikawa |
| 3,960,364 | A | * | 6/1976 | Hargrave ..................... 251/210 |
| 3,973,576 | A | | 8/1976 | Dietiker et al. |
| 3,973,976 | A | | 8/1976 | Boyd |
| 3,993,939 | A | | 11/1976 | Slavin et al. |
| 4,115,036 | A | | 9/1978 | Paterson |
| 4,140,936 | A | | 2/1979 | Bullock |
| 4,188,013 | A | | 2/1980 | Battersby et al. |
| 4,188,972 | A | | 2/1980 | van der Zee |
| 4,197,737 | A | | 4/1980 | Pittman |

(Continued)

FOREIGN PATENT DOCUMENTS

DE 19617852 10/1997

(Continued)

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.

(Continued)

*Primary Examiner*—John Fox

(57) ABSTRACT

A gas valve having a valve member disposed within a valve cavity, and an elastomeric valve seat extending from a valve cavity wall into the valve cavity. The valve member is movable between an open position in which the valve member does not engage the resilient valve seat thereby permitting gas to flow through the gas valve, and a closed position in which the valve member does engage the resilient valve seat thereby preventing gas to flow through the gas valve. In some embodiments, the elastomeric valve seat extends radially into the valve cavity from a groove formed in the valve cavity wall.

8 Claims, 6 Drawing Sheets

U.S. PATENT DOCUMENTS

| | | | |
|---|---|---|---|
| 4,242,080 A | 12/1980 | Tabei | |
| 4,360,955 A | 11/1982 | Block | |
| 4,402,340 A * | 9/1983 | Lockwood, Jr. | 137/493.7 |
| 4,418,886 A | 12/1983 | Holzer | |
| 4,442,853 A | 4/1984 | Gort | |
| 4,450,868 A * | 5/1984 | Duval et al. | 137/625.34 |
| 4,453,169 A | 6/1984 | Martner | |
| 4,478,076 A | 10/1984 | Bohrer | |
| 4,478,077 A | 10/1984 | Bohrer et al. | |
| 4,498,850 A | 2/1985 | Perlov et al. | |
| 4,501,144 A | 2/1985 | Higashi et al. | |
| 4,539,575 A | 9/1985 | Nilsson | |
| 4,543,974 A | 10/1985 | Dietiker et al. | |
| 4,576,050 A | 3/1986 | Lambert | |
| 4,581,624 A | 4/1986 | OConnor | |
| 4,585,209 A | 4/1986 | Aine et al. | |
| 4,619,438 A | 10/1986 | Coffee | |
| 4,651,564 A | 3/1987 | Johnson et al. | |
| 4,654,546 A | 3/1987 | Kirjavainen | |
| 4,722,360 A | 2/1988 | Odajima et al. | |
| 4,756,508 A | 7/1988 | Giachino et al. | |
| 4,821,999 A | 4/1989 | Ohtaka | |
| 4,829,826 A | 5/1989 | Valentin et al. | |
| 4,836,247 A | 6/1989 | Chuang | |
| 4,898,200 A | 2/1990 | Odajima et al. | |
| 4,911,616 A | 3/1990 | Laumann, Jr. | |
| 4,938,742 A | 7/1990 | Smits | |
| 4,939,405 A | 7/1990 | Okuyama et al. | |
| 5,022,435 A | 6/1991 | Jaw-Shiunn | |
| 5,065,978 A | 11/1991 | Albarda et al. | |
| 5,069,419 A | 12/1991 | Jerman | |
| 5,078,581 A | 1/1992 | Blum et al. | |
| 5,082,242 A | 1/1992 | Bonne et al. | |
| 5,082,246 A | 1/1992 | Stanley et al. | |
| 5,085,562 A | 2/1992 | van Lintel | |
| 5,096,388 A | 3/1992 | Weinberg | |
| 5,129,794 A | 7/1992 | Beatty | |
| 5,148,074 A | 9/1992 | Fujita et al. | |
| 5,171,132 A | 12/1992 | Miyazaki et al. | |
| 5,176,358 A | 1/1993 | Bonne et al. | |
| 5,180,288 A | 1/1993 | Richter et al. | |
| 5,180,623 A | 1/1993 | Ohnstein | |
| 5,186,054 A | 2/1993 | Sekimura | |
| 5,192,197 A | 3/1993 | Culp | |
| 5,193,993 A | 3/1993 | Dietiker | |
| 5,203,688 A | 4/1993 | Dietiker | |
| 5,206,557 A | 4/1993 | Bobbio | |
| 5,215,115 A | 6/1993 | Dietiker | |
| 5,219,278 A | 6/1993 | van Lintel | |
| 5,224,843 A | 7/1993 | van Lintel | |
| 5,244,527 A | 9/1993 | Aoyagi | |
| 5,244,537 A | 9/1993 | Ohnstein | |
| 5,263,514 A * | 11/1993 | Reeves | 137/625.33 |
| 5,322,258 A | 6/1994 | Bosch et al. | |
| 5,323,999 A | 6/1994 | Bonne et al. | |
| 5,325,880 A | 7/1994 | Johnson et al. | |
| 5,336,062 A | 8/1994 | Richter | |
| 5,368,571 A | 11/1994 | Horres, Jr. | |
| 5,441,597 A | 8/1995 | Bonne et al. | |
| 5,452,878 A | 9/1995 | Gravesen et al. | |
| 5,499,909 A | 3/1996 | Yamada et al. | |
| 5,526,172 A | 6/1996 | Kanack | |
| 5,529,465 A | 6/1996 | Zengerle et al. | |
| 5,536,963 A | 7/1996 | Polla | |
| 5,541,465 A | 7/1996 | Higuchi et al. | |
| 5,552,654 A | 9/1996 | Konno et al. | |
| 5,571,401 A | 11/1996 | Lewis et al. | |
| 5,642,015 A | 6/1997 | Whitehead et al. | |
| 5,683,159 A | 11/1997 | Johnson | |
| 5,696,662 A | 12/1997 | Bauhahn | |
| 5,725,363 A | 3/1998 | Bustgens et al. | |
| 5,735,503 A | 4/1998 | Hietkamp | |
| 5,759,014 A | 6/1998 | Van Lintel | |
| 5,759,015 A | 6/1998 | Van Lintel et al. | |
| 5,792,957 A | 8/1998 | Luder et al. | |
| 5,808,205 A | 9/1998 | Romo | |
| 5,822,170 A | 10/1998 | Cabuz et al. | |
| 5,836,750 A | 11/1998 | Cabuz | |
| 5,839,467 A | 11/1998 | Saaski et al. | |
| 5,863,708 A | 1/1999 | Zanzucchi et al. | |
| 5,901,939 A | 5/1999 | Cabuz et al. | |
| 5,911,872 A | 6/1999 | Lewis et al. | |
| 5,944,257 A | 8/1999 | Dietiker et al. | |
| 5,954,079 A | 9/1999 | Barth et al. | |
| 5,971,355 A | 10/1999 | Biegelsen et al. | |
| 6,050,281 A | 4/2000 | Adams et al. | |
| 6,106,245 A | 8/2000 | Cabuz | |
| 6,109,889 A | 8/2000 | Zengerle et al. | |
| 6,116,863 A | 9/2000 | Ahn et al. | |
| 6,122,973 A | 9/2000 | Nomura et al. | |
| 6,151,967 A | 11/2000 | McIntosh et al. | |
| 6,167,761 B1 | 1/2001 | Hanzawa et al. | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,189,568 B1 | 2/2001 | Bergum et al. | |
| 6,215,221 B1 | 4/2001 | Cabuz et al. | |
| 6,240,944 B1 | 6/2001 | Ohnstein et al. | |
| 6,288,472 B1 | 9/2001 | Cabuz et al. | |
| 6,373,682 B1 | 4/2002 | Goodwin-Johansson | |
| 6,418,793 B1 | 7/2002 | Pechoux et al. | |
| 6,445,053 B1 | 9/2002 | Cho | |
| 6,496,348 B2 | 12/2002 | McIntosh | |
| 6,505,838 B1 | 1/2003 | Cavaliere | |
| 6,508,528 B2 | 1/2003 | Fujii et al. | |
| 6,520,753 B1 | 2/2003 | Grosjean et al. | |
| 6,561,791 B1 | 5/2003 | Vrolijk et al. | |
| 6,571,817 B1 | 6/2003 | Bohan, Jr. | |
| 6,579,087 B1 | 6/2003 | Vrolijk | |
| 6,590,267 B1 | 7/2003 | Goodwin-Johansson et al. | |
| 6,640,642 B1 | 11/2003 | Onose et al. | |
| 6,651,506 B2 | 11/2003 | Lee et al. | |
| 6,814,102 B2 * | 11/2004 | Hess et al. | 137/625.5 |
| 6,880,548 B2 | 4/2005 | Schultz et al. | |
| 6,983,759 B2 | 1/2006 | Maichel et al. | |
| 6,994,308 B1 | 2/2006 | Wang et al. | |
| 7,089,959 B2 | 8/2006 | Cai | |
| 2002/0078756 A1 | 6/2002 | Akiyama et al. | |
| 2002/0174706 A1 | 11/2002 | Gokhfeld | |
| 2003/0005774 A1 | 1/2003 | Suzuki et al. | |
| 2003/0019299 A1 | 1/2003 | Horie et al. | |
| 2003/0020033 A1 | 1/2003 | Wang | |
| 2003/0033884 A1 | 2/2003 | Beekhuizen et al. | |
| 2003/0189809 A1 | 10/2003 | Ishikura | |
| 2003/0205090 A1 | 11/2003 | Jakobsen | |
| 2004/0035211 A1 | 2/2004 | Pinto et al. | |
| 2004/0060360 A1 | 4/2004 | Chen | |
| 2006/0043323 A1 | 3/2006 | Wang et al. | |
| 2006/0226387 A1 | 10/2006 | Kidprasert | |

FOREIGN PATENT DOCUMENTS

| | | |
|---|---|---|
| EP | 0744821 | 11/1996 |
| JP | 02-086258 | 3/1990 |
| JP | 05-219760 | 8/1993 |
| SU | 744877 | 6/1980 |
| WO | 9729538 | 8/1997 |
| WO | 0028215 | 5/2000 |
| WO | 0133078 | 5/2001 |

OTHER PUBLICATIONS

Athavale et al., "Coupled Electrostatics-Structures-Fluidic Simulations of A Bead Mesopump," Proceedings of the International Mechanical Engineers Congress & Exhibition, pp. 1-7, Oct. 1999.

Bertz et al., "Silicon Grooves With Sidewall Angles Down to 1° made by Dry Etching", pp. 331-339, prior to Dec. 29, 2004.

Bonne et al. "Actuation-Based Fuel Gas Microsensors", IGT Symposium on "Natural Gas Quality, Energy Measurement, Metering and Utilization Practices", 17 pages, Mar. 2001.

Branebjerg, Gravesen, "A New Electrostatic Actuator Providing Improved Stroke Length and Force." IEEE, pp. 6-11, Feb. 4-7, 1992.

Bustgens et al., "Micropump Manufactured by Thermoplastic Molding" IEEE, pp. 18-21, 1994.

Cabuz et al., "Factors Enhancing the Reliability of Touch-Mode Electrostatic Actuators," Sensors and Actuators 79, pp. 245-250, 2000.

Cabuz et al., "Mesoscopic Sampler Based on 3D Array of Electrostatically Activated Diaphragms," Proceedings of the 10th Int. Conf. On Solid-State Sensors and Actuators, Transducers 1999.

C. Cabuz et al., "The Dual Diaphragm Pump," 4 pages prior to Dec. 29, 2004.

Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.

Cabuz. "Tradeoffs in MEMS Materials," SPIE, vol. 2881, pp. 160-170, prior to Dec. 29, 2004.

Cabuz, "Electrical Phenomena at the Interface of Rolling-Contact, Electrostatic Actuators," 16 pages, prior to Dec. 29, 2004.

Cabuz, "Dielectric Related Effects in Micromachined Electrostatic Actuators," IEEE, 1999 Conference on Electrical Insulation and Dielectric Phenomena, pp. 327-332, 1999.

Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.

Halg, "On a Nonvolatile Memory Cell Based on Micro-Electro-Mechanics", IEEE pp. 172-176, 1990.

Minami K et al., "Fabrication of Distributed Electrostatic Micro Actuator (DEMA)," IEEE Journal of Microelectromechanical Systems, vol. 2, No. 3, pp. 121-127, Sep. 1993.

Ohnstein et al., "Micromachined Silicon Microvalve," IEEE, pp. 95-98, 1990.

Porex Technologies, brochure, 4 pages, prior to Dec. 29, 2004.

Shikida et al., "Characteristics of an Electrostatically-Driven Gas Valve Under High Pressure Conditions," IEEE , pp. 235-240, 1994.

Shikida et al., "Fabrication of An S-Shaped Microactuator," IEEE Journal of Microelectromechanical Systems, vol. 6, No. 1, pp. 18-24, Mar. 1997.

Shikida et al., "Electrostatically Driven Gas Valve With High Conductance," IEEE Journal of Microelectromechanical Systems, vol. 3, No. 2, pp. 76-80, Jun. 1994.

Srinivasan et al., "Self-Assembled Fluorocarbon Films for Enhanced Stiction Reduction", IEEE Tranducers, 1997 International Conference on Solid-State Sensors and Actuators, Chicago, pp. 1399-1402, Jun. 16-19, 1997.

Wagner et al., "Bistable Microvalve with Pneumatically Coupled Membranes," IEEE, pp. 384-388, 1996.

Yang et al., "Fluorescent Porous Polymer Films as TNT Chemosensors: Electronic and Structural Effects", J. Am. Chem. Soc., pp. 11864-11873, 1998.

Yang et al., "Porous Shape Persistent Fluorescent Polymer Films: An Approach to TNT Sensory Materials", J. Am. Chem. Soc., pp. 5321-5322, 1998.

\* cited by examiner

US 7,644,731 B2

GAS VALVE WITH RESILIENT SEAT

TECHNICAL FIELD

The present invention relates generally to valves such as gas valves.

BACKGROUND

A number of gas-fed appliances are known. A gas-fed appliance typically employs a gas valve to control the flow of gas to a burner in which the gas is burned to produce heat. In many cases, a gas valve either permits gas to flow, or ceases to permit gas to flow in response to a control signal from a control device such as a thermostat or other controller. A need remains for improved gas valves.

SUMMARY

The present invention relates generally to an improved gas valve. An illustrative but non-limiting example of the present invention may be found in a gas valve that includes a valve body that defines a valve cavity having a valve cavity wall. One or more grooves may be formed in the valve cavity wall, and a resilient elastomeric seat may be secured within each of the one or more grooves. The elastomeric seats may extend radially from the one or more grooves and at least partially into the valve cavity. A valve member may be disposed within the valve cavity, and may be movable from an open position where the valve member does not engage the one or more elastomeric seats, and a closed position where the valve member does engage one or more elastomeric seats. In some illustrative embodiments, the gas valve may be configured to permit removal of an elastomeric seat and installation of a replacement elastomeric seat.

It is recognized that providing a groove in the valve cavity wall to accept an elastomeric seat may increase the sealing surface area between the valve body and the elastomeric seat. This may be beneficial when, for example, the valve body is die cast or otherwise formed and includes porous areas. Porous areas that are at or near sealing surfaces can be prone to leakage, which can be undesirable in gas valve and other applications. Increasing the sealing surface area between the valve body and the elastomeric seat can, in some cases, reduce leakage. While reduced leakage may be one benefit that may be realized by providing a groove that accepts an elastomeric seat, it is contemplated that achieving such a benefit is not required in all embodiments. The structure of the gas valve may provide other benefits even when the valve body does not contain porous areas and/or when reduced leakage is not required or even desired.

The above summary of the present invention is not intended to describe each disclosed embodiment or every implementation of the present invention. The Figures, Detailed Description and Examples which follow more particularly exemplify these embodiments.

BRIEF DESCRIPTION

The invention may be more completely understood in consideration of the following detailed description of various embodiments of the invention in connection with the accompanying drawings, in which.

Figure 1:
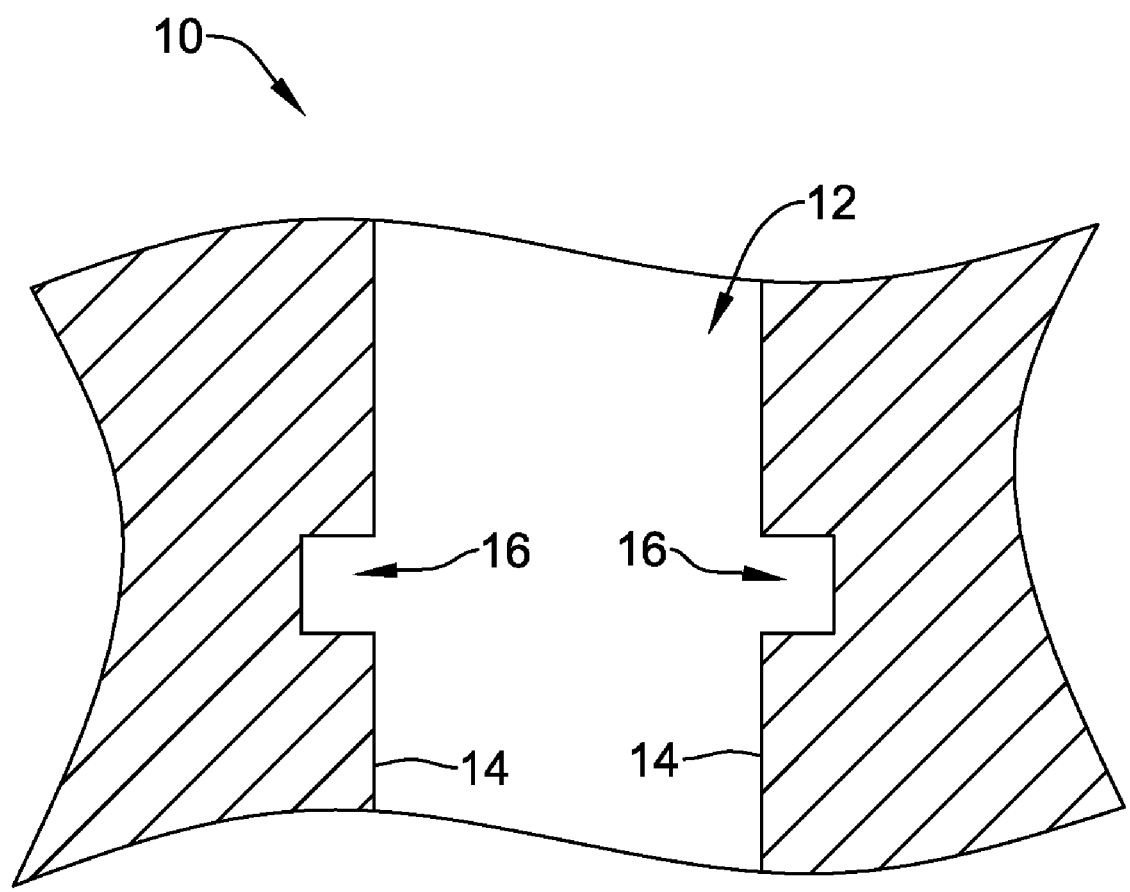
FIG. 1 is a partial cross-sectional view of a portion of a gas valve body in accordance with an illustrative embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a partial cross-sectional view of a portion of an illustrative valve body 10. Valve body 10 defines a valve cavity 12 that may include a valve cavity wall 14. In some cases, valve cavity wall 14 may be at least partially cylindrical in shape, although it is contemplated that any suitable shape may be used. Valve body 10 may be formed of any suitable material, using any suitable technique. In some instances, valve body 10 may be machined, die cast or molded from any suitable metal, plastic, or any other material or material combination, as desired.

In the illustrative embodiment, a groove 16 is disposed within valve cavity wall 14. it is contemplated that groove 16 may be milled, ground, molded or otherwise formed within valve cavity wall 14. In some instances, groove 16 may extend around at least a substantial portion of valve cavity wall 14, and more preferably, all the way around the valve cavity wall. In some cases, as illustrated, groove 16 may have an at least substantially rectangular profile, but this is not required. It is contemplated that groove 16 may have a rounded profile, a T-shaped profile (not shown), or any other profile that may be adapted to accommodate a particular elastomeric seat.

Figure 2:
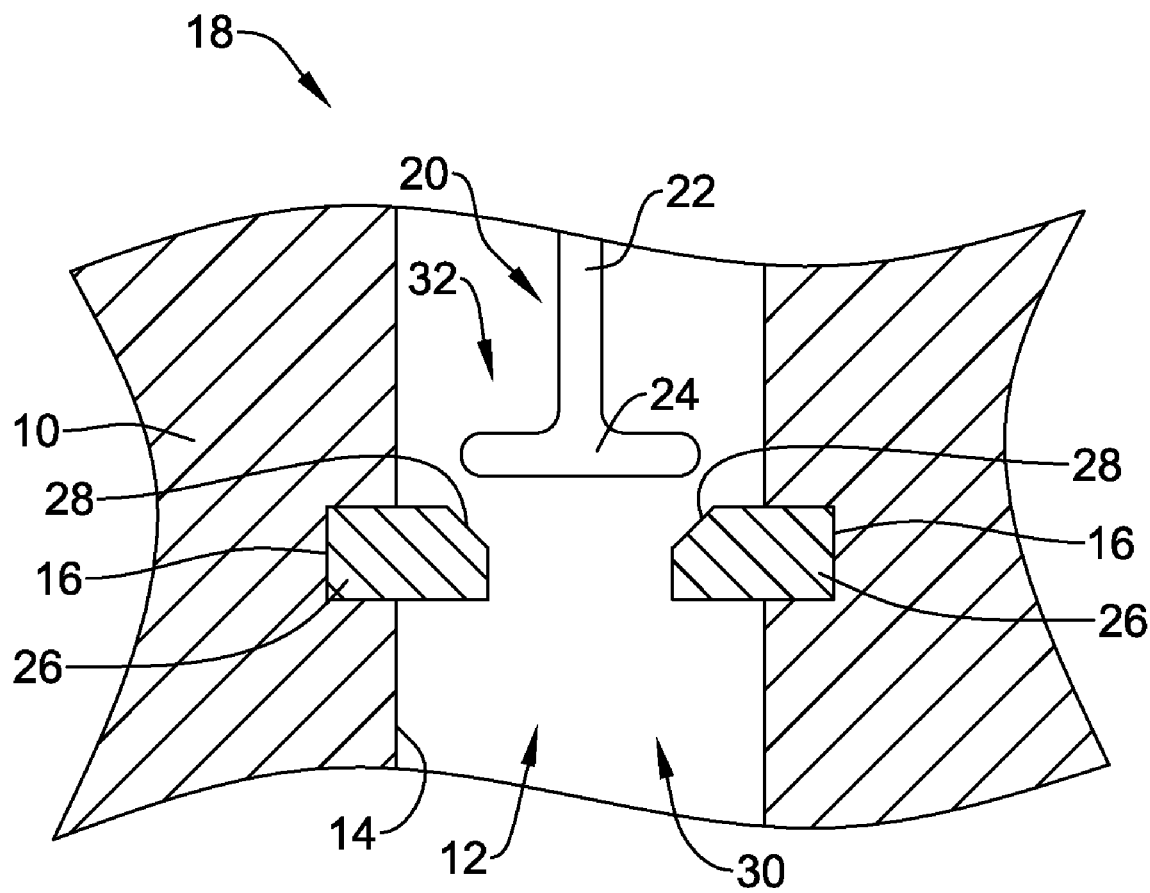
FIG. 2 is a partial cross-sectional view of a portion of a gas valve incorporating the gas valve body of FIG. 1 in accordance with an illustrative embodiment of the present invention.

FIG. 2 is a partial cross-sectional view of a portion of an illustrative gas valve 18 that may incorporate valve body 10. Gas valve 18 includes a valve member 20 that is movably disposed within valve cavity 12. In some instances, valve member 20 may include a shaft 22 and an enlarged portion such as a disk 24. While disk 24 may be substantially round in shape, it is contemplated that disk 24 may have any suitable shape, as desired.

In some cases, shaft 22 and disk 24 may be integrally formed, or separately formed and subsequently secured together, as desired. Valve member 20 may be formed of metal, plastic or any other suitable material or material combination, as desired. In particular instances, valve member 20 may be formed of a lightweight metal material such as aluminum.

In the illustrative embodiment, valve member 20 may be movable between an open position in which gas flow is permitted through valve cavity 12, and a closed position in which gas does not flow through valve cavity 12. Valve member 20 may be moved in any suitable manner known in the art. For example, valve member 20 may move up and down (in the illustrated orientation) in response to a solenoid, an electric motor, a spring force, or any other appropriate movement mechanism, as desired. In this, upper and lower are relative terms pertaining to the illustrated embodiment. It will be recognized that gas valve 18 may function in any spatial orientation.

In the illustrative embodiment, an elastomeric seat 26 may be disposed within groove 16. In some instances, elastomeric seat 26 may be held in place within groove 16 via a compressive and/or interference fit resulting from the relative dimensions and/or shape of groove 16 and elastomeric seat 26. In some cases, and as shown in FIG. 2, elastomeric seat 26 may extend radially into valve cavity 12. In some cases, elastomeric seat 26 may extend around at least a substantial portion of groove 16, and more preferably, may be annular in shape and may extend all the way around groove 16. It is contemplated that elastomeric seat 26 may be formed of any material that provides a desired level of flexibility or resiliency while providing sufficient resistance to deformation. In some cases, elastomeric seat 26 may include or be formed of a resilient material such as rubber.

In some embodiments, and as illustrated in FIG. 2, elastomeric seat 26 may include a conical mating surface 28 that provides a surface for disk 24 to contact. In some instances, conical mating surface 28 may help keep valve member 20 centered relative to the elastomeric seat 26 and valve cavity 12, and may thus help provide a better seal between valve member 20 and elastomeric seat 26. While not illustrated, it is contemplated that elastomeric seat 26 may have other profiles. For example, elastomeric seat 26 or at least a portion thereof that contacts disk 24 may have an ovoid, circular, rectangular or other profile as may be useful, dependent upon the shape of disk 24.

In the illustrative embodiment, valve cavity 12 may be considered as including a lower chamber 30 disposed below elastomeric seat 26 and an upper chamber 32 disposed above elastomeric seat 26. In FIG. 2, valve member 20 is in an open position in which gas may, for example, enter valve cavity 12 through lower chamber 30, pass by disk 24, and exit valve cavity 12 through upper chamber 32. It can be seen that when valve member 20 is in the open position, gas passes or flows between valve member 20 and elastomeric seat 26. Alternatively, gas may enter valve cavity 12 through upper chamber 32 and may exit through lower chamber 30, depending on the configuration. As noted above, reference to up and down are relative terms pertaining only to the illustrated embodiment.

Figure 3:
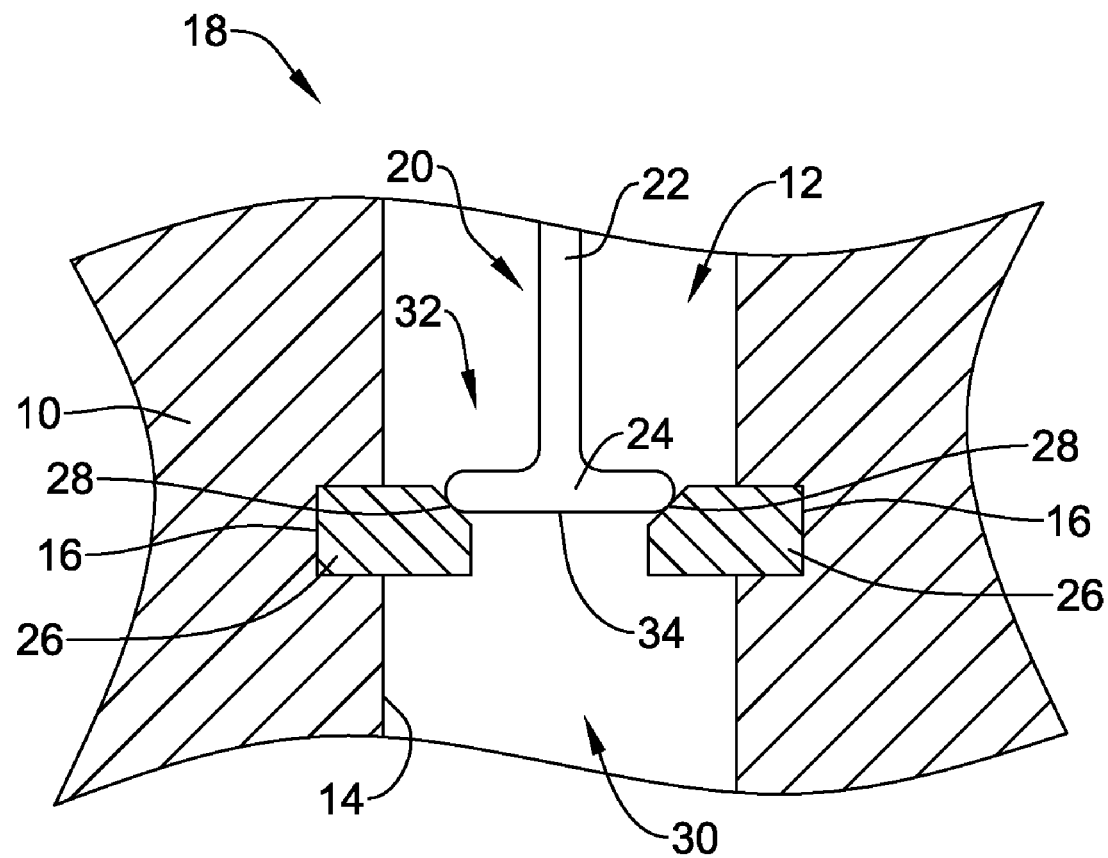
FIG. 3 is a view of the illustrative gas valve of FIG. 2, shown in a closed position.

FIG. 3 illustrates gas valve 18 in a closed position in which gas flow through gas valve 18 is prevented or at least substantially reduced. In FIG. 3, valve member 20 has moved downward (in the illustrated orientation) such that disk 24 has contacted elastomeric seat 26. In some cases, valve member 20 may be considered as having an outer contact surface 34 that interacts with elastomeric seat 26 to stop gas flow between valve member 20 and elastomeric seat 26 when valve member 20 is in the closed position. In some cases, elastomeric seat 26 may bend or deform slightly in response to contact with valve member 20. This deformation may help provide a better seal against gas flow between valve member 20 and elastomeric seat 26 and/or between groove 16 and elastomeric seat 26.

Figure 4:
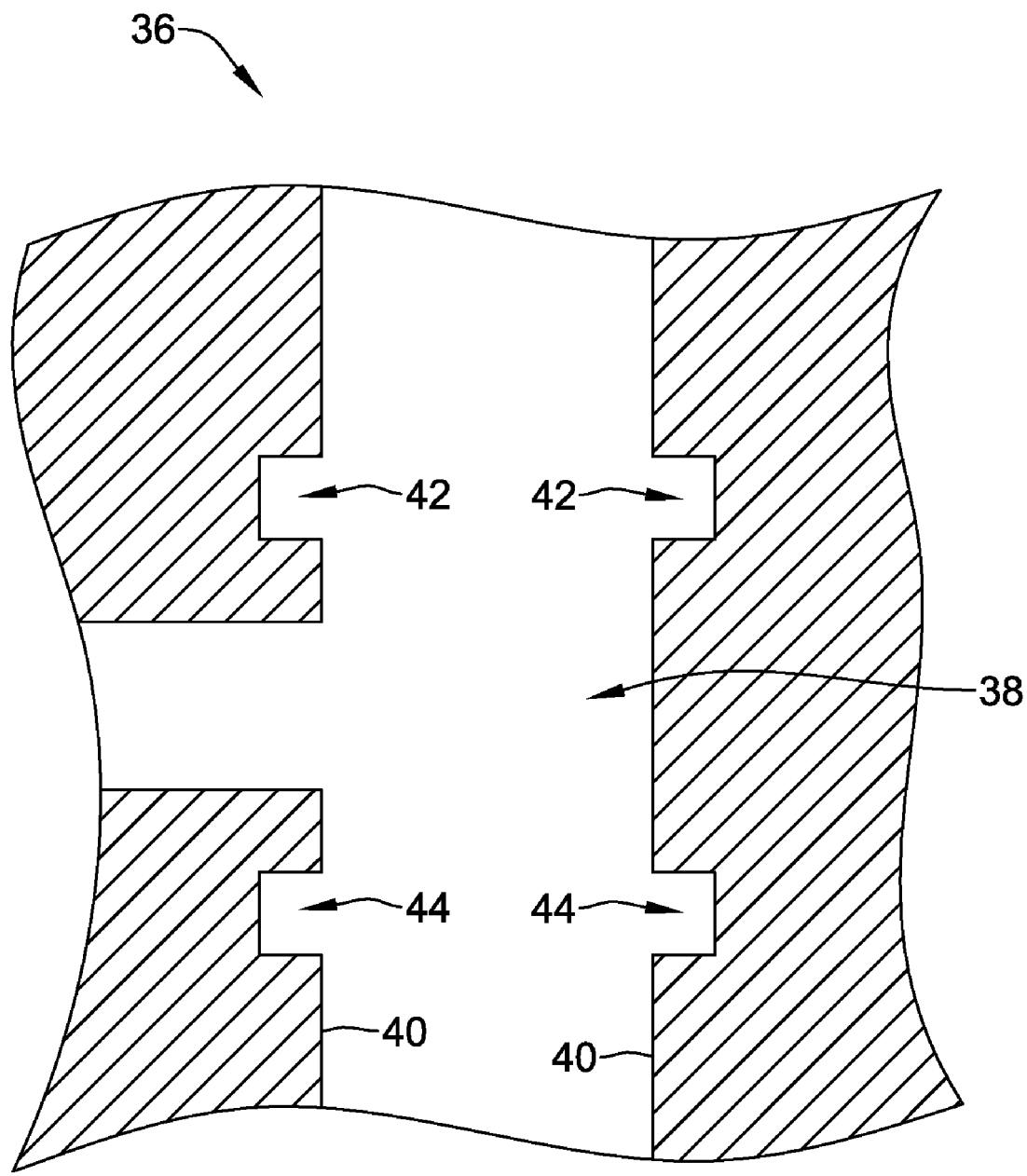
FIG. 4 is a partial cross-sectional view of a portion of a gas valve body in accordance with another illustrative embodiment of the present invention.

FIG. 4 is a partial cross-sectional view of a portion of another illustrative valve body 36. Valve body 36 defines a valve cavity 38 that may include a valve cavity wall 40. In some cases, valve cavity wall 40 may be considered as being at least partially cylindrical in shape, although this is not required. Valve body 36 may be formed of any suitable material, using any suitable technique. In some instances, valve body 36 may be machined, die cast or molded from any suitable metal, plastic, or any other material or material combination, as desired.

In some instances, a first groove 42 and/or a second groove 44 may be disposed within valve cavity wall 40. First groove 42 and/or second groove 44 may be milled, ground, molded or otherwise formed within valve cavity wall 40. In some instances, first groove 42 and second groove 44 may extend around at least a substantial portion of valve cavity wall 40, and more preferably, all the way around valve cavity wall 40. In some cases, as illustrated, first groove 42 and/or second groove 44 may have an at least substantially rectangular profile, but this is not required. For example, and in some instances, first groove 42 and/or second groove 44 may have a rounded profile, a T-shaped (not shown) profile, or any other profile that may be adapted to accommodate a particular elastomeric seat.

Figure 5:
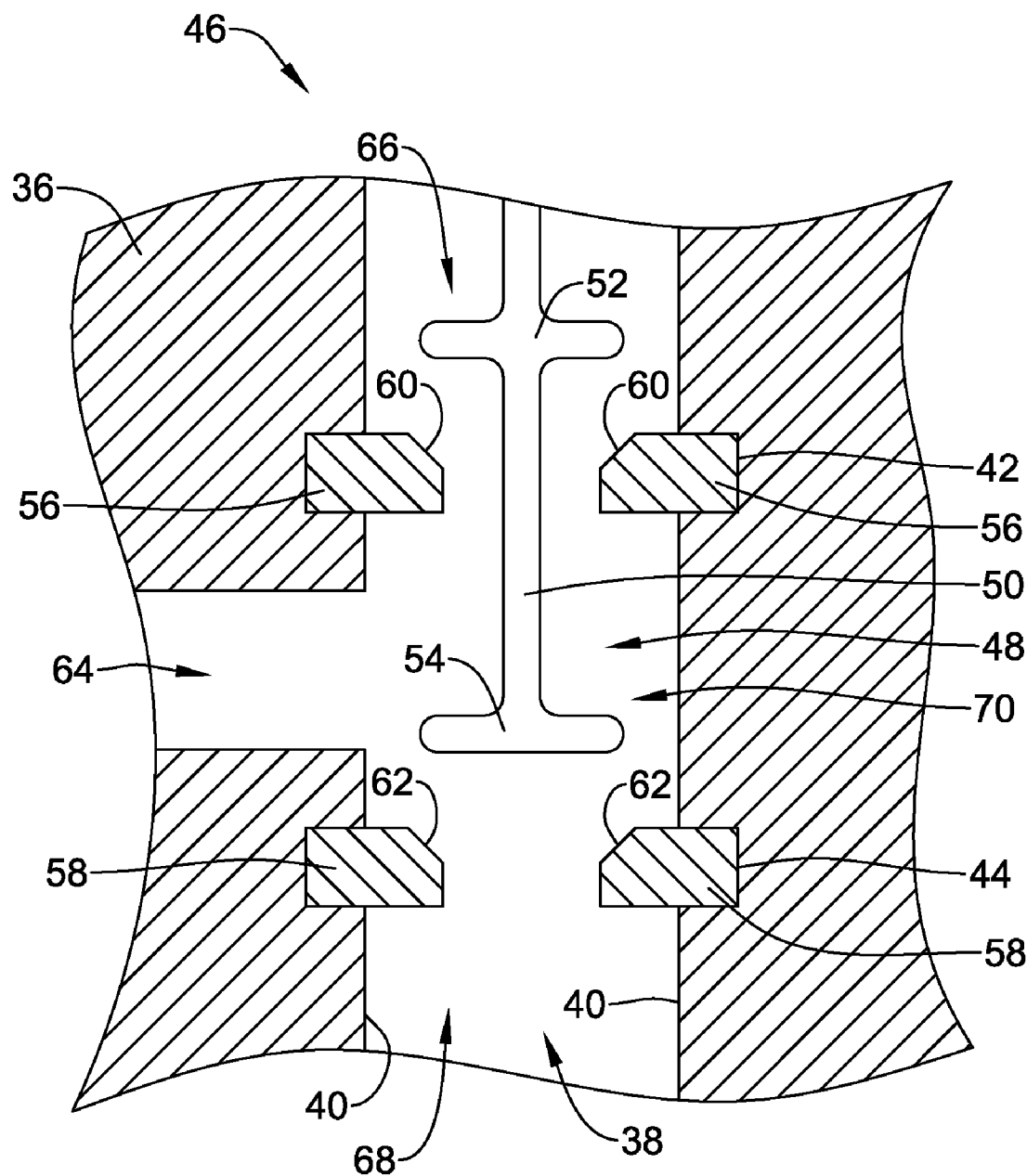
FIG. 5 is a partial cross-sectional view of a portion of a gas valve incorporating the gas valve body of FIG. 4 in accordance with an illustrative embodiment of the present invention.

FIG. 5 is a partial cross-sectional view of a portion of an illustrative gas valve 46 that may incorporate valve body 36. Gas valve 46 includes a valve member 48 that is movably disposed within valve cavity 38. In some instances, valve member 48 may include a shaft 50, a first disk 52 and a second disk 54. It is contemplated that shaft 50, first disk 52 and second disk 54 may be integrally formed, or one or more components of valve member 48 may be separately formed and subsequently secured together, as desired.

In the illustrative embodiment, valve member 48 may be movable between an open position in which gas flow is permitted through valve cavity 38 and a closed position in which gas does not flow through valve cavity 38. Valve member 48 may be moved in any suitable manner known in the art. For example, valve member 48 may move up and down (in the illustrated orientation) in response to a solenoid, an electric motor, a spring force, or any other appropriate movement mechanism, as desired.

In some instances, a first elastomeric seat 56 may be disposed within first groove 42, and a second elastomeric seat 58 may be disposed within second groove 44. First elastomeric seat 56 and/or second elastomeric seat 58 may extend radially into valve cavity 40, as shown. In some cases, first elastomeric seat 56 may be held in place within first groove 42 via a compressive and/or interference fit, and second elastomeric seat 58 may be held in place within second groove 44 via a compressive and/or interference fit. First elastomeric seat 56 and/or second elastomeric seat 58 may be sized and configured such that they are held in place within the respective first groove 42 and/or second groove 44, but can if necessary be removed and replaced, but this is not required in all embodiments.

First elastomeric seat 56 may extend around at least a substantial portion of first groove 42, and more preferably, all the way around first groove 42 and may be generally annular in shape. Similarly, second elastomeric seat 58 may extend around at least a substantial portion of second groove 44, and more preferably, all the way around second groove 44 and may be generally annular in shape.

It is contemplated that first elastomeric seat 56 and second elastomeric seat 58 may be formed of any material that provides a desired level of flexibility or resiliency while providing sufficient resistance to deformation. In some cases, first elastomeric seat 56 and/or second elastomeric seat 58 may include or be formed of a resilient material such as rubber. In some illustrative embodiments, first elastomeric seat 56 and second elastomeric seat 58 may be formed of the same material and may have similar if not substantially identical flexibility and resiliency characteristics. In other embodiments, first elastomeric seat 56 may be softer than second elastomeric seat 58, or visa-versa. In such a situation, first elastomeric seat 56 may compress somewhat further in order to provide a better seal, while second elastomeric seat 58 may provide sufficient resistance to prevent excessive deformation and/or crushing of the first elastomeric seat 56.

In some cases, as illustrated, first elastomeric seat 56 may include a conical mating surface 60 that provides a surface for first disk 52 to contact. Likewise, second elastomeric seat 58 may, if desired, include a conical mating surface 62 that provides a surface for second disk 54 to contact. In some instances, conical mating surface 60 and/or conical mating surface 62 may help keep valve member 48 centered relative to the first elastomeric seat 56 and/or the second elastomeric seat 58 to help provide a better seal against valve member 48.

While not illustrated, it is contemplated that first elastomeric seat 56 and/or second elastomeric seat 58 may have other profiles. For example, first elastomeric seat 56 and/or second elastomeric seat 58 or at least portions thereof may have an ovoid, circular, rectangular or other profile as may be useful, dependent upon the shape of first disk 52 and/or second disk 54.

It will be appreciated that in assembling gas valve 46, it may be useful to first, for example, dispose second elastomeric seat 58 in place within second groove 44. First elastomeric seat 56 may, if desired, be disposed about valve member 48 somewhere between first disk 52 and second disk 54 by stretching first elastomeric seat 56 over either first disk 52 or second disk 54. Valve member 48 may then be lowered (in the illustrated configuration) into valve cavity 38 and first elastomeric seat 56 may be disposed within first groove 42.

It will be recognized that if valve member 48 enters valve cavity 38 from below, for example, that it may be useful to first install first elastomeric seat 56 within first groove 42, and then to dispose second elastomeric seat 58 about valve member 48 before installing valve member 48 within valve cavity 38 and subsequently installing second elastomeric seat 58 into second groove 44.

Valve cavity 38 may be considered as including an inflow region 64, a first outflow region 66, a second outflow region 68 and an intermediate region 70. In FIG. 5, valve member 48 is in an open position in which gas may, for example, enter through inflow region 64 and into intermediate region 70, and then flow into first outflow region 66 by passing between first elastomeric seat 56 and first disk 52. Gas may also flow into second outflow region 68 by passing between second elastomeric seat 58 and second disk 54.

Figure 6:
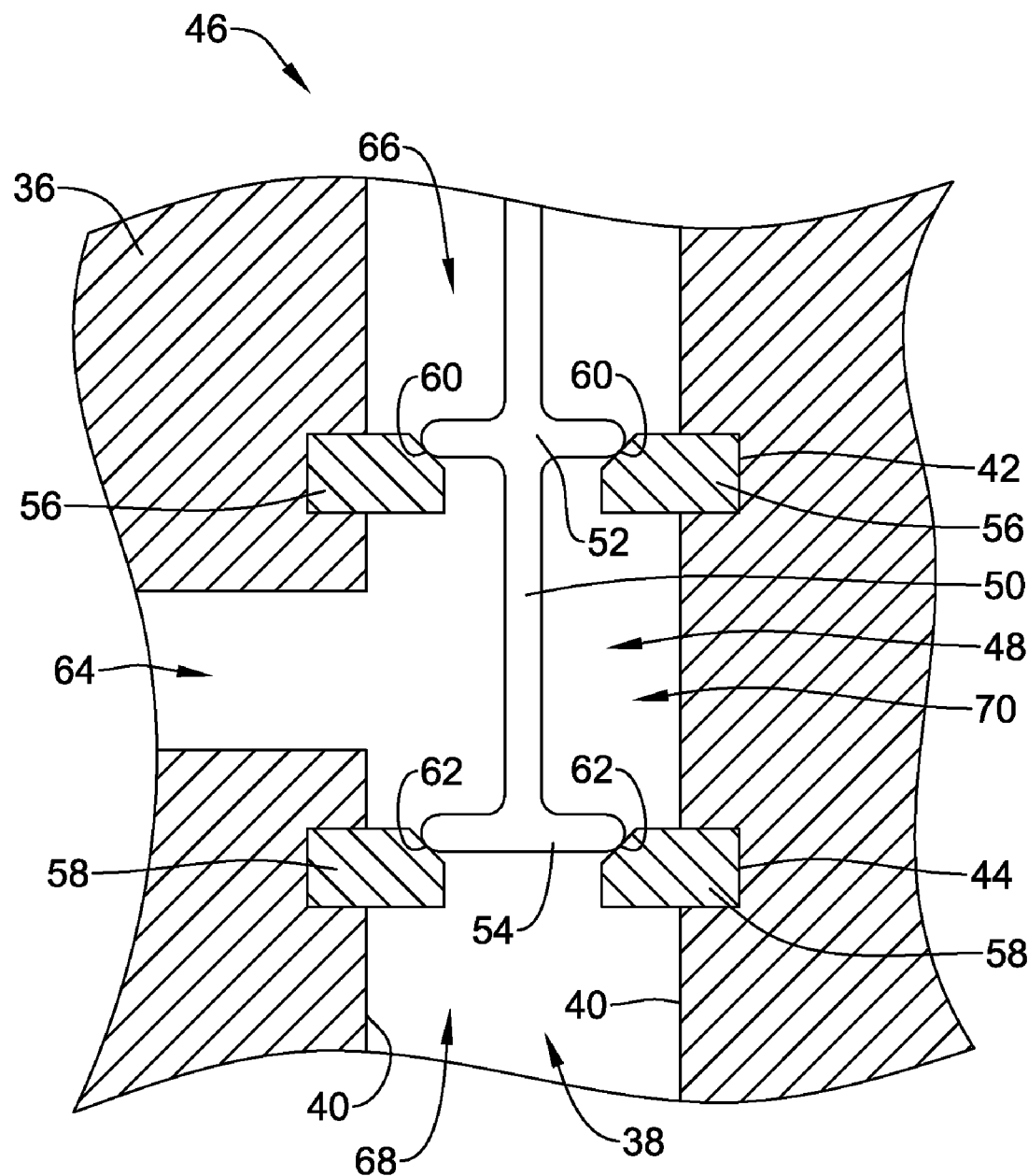
FIG. 6 is a view of the illustrative gas valve of FIG. 5, shown in a closed position.

FIG. 6 illustrates gas valve 46 in a closed position in which gas flow through gas valve 46 is prevented or at least substantially reduced. In FIG. 6, valve member 48 has moved downward (in the illustrated orientation) such that first disk 52 has contacted first elastomeric seat 56 and second disk 54 has contacted second elastomeric seat 58. In some cases, first elastomeric seat 56 and/or second elastomeric seat 58 may bend or deform slightly in response to contact with valve member 48. This deformation may help provide a better seal against valve member 48.

In some cases, gas valve 46 may be considered as being a balanced port valve in that gas entering inflow region 64 may flow past first disk 52 and out through first outflow region 66 as well as past second disk 54 and out through second outflow region 68. As gas flows past first disk 52, the gas may exert an upward (as illustrated) force on valve member 48. Similarly, as gas flows past second disk 54, the gas may exert a downward (as illustrated) force on valve member 48. These upwardly and downwardly applied forces may at least partially cancel each other out, meaning that a smaller net force is needed to move valve member 48 either up or down in order to either open or close gas valve 46.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A gas valve comprising:
    a valve body having a valve cavity, wherein the valve cavity is defined by a valve cavity wall;
    a valve member disposed within the valve cavity, the valve member comprising a first disk and a second disk;
    a first groove formed within the valve cavity wall proximate the first disk;
    a second groove formed within the valve cavity wall proximate the second disk;
    a first elastomeric seal disposed within the first groove;
    a second elastomeric seal disposed within the second groove;
    wherein the first disk contacts the first elastomeric seal and the second disk contacts the second elastomeric seal when the valve member moves into the closed position;
    wherein at least one of the first elastomeric seal and the second elastomeric seal are structured to help center the valve member relative to the first elastomeric seal and/or the second elastomeric seal; and
    wherein the first elastomeric seal is substantially softer than the second elastomeric seal such that the first elastomeric seal may compress further in order to provide a better seal, while the second elastomeric seal may provide sufficient resistance to prevent excessive deformation and/or crushing of the first elastomeric seal.

2. The gas valve of claim 1, wherein the valve member is movable between an open position in which gas flow is permitted through the gas valve and a closed position in which gas flow is not permitted through the gas valve.

3. The gas valve of claim 1, wherein the first elastomeric seal fits snugly within the first groove.

4. The gas valve of claim 1, wherein the second elastomeric seal fits snugly within the second groove.

5. The gas valve of claim 1, wherein the first groove and the second groove are at least substantially annular.

6. The gas valve of claim 5, wherein the first elastomeric seat and the second elastomeric seat are at least substantially annular.

7. The gas valve of claim 1, wherein:
    the valve body is a single piece valve body; and
    the first groove and the second groove are integrally formed within the valve cavity wall.

8. The gas valve of claim 1, wherein:
    the valve cavity includes an inflow region, an intermediate region, a first outflow region and a second outflow region;

the inflow region is in fluid communication with the intermediate region;
the intermediate region is disposed between the first and second grooves;
the first outflow region disposed opposite the intermediate region relative to the first groove;
the second outflow region disposed opposite the intermediate region relative to the second groove; and wherein the valve member may be disposed in an open position, wherein gas may flow from the inflow region to the intermediate region and to the first and second outflow regions, and in a closed position, wherein gas flow is not permitted between the intermediate region and the first and second outflow regions.

* * * * *

UNITED STATES PATENT AND TRADEMARK OFFICE
CERTIFICATE OF CORRECTION

PATENT NO. : 7,644,731 B2  Page 1 of 1
APPLICATION NO. : 11/565480
DATED : January 12, 2010
INVENTOR(S) : Benda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 282 days.

Signed and Sealed this

Sixteenth Day of November, 2010

David J. Kappos
*Director of the United States Patent and Trademark Office*